(12) United States Patent
Terris et al.

(10) Patent No.: US 8,694,835 B2
(45) Date of Patent: Apr. 8, 2014

(54) SYSTEM HEALTH MONITORING

(75) Inventors: Benjamin S. Terris, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 13/238,946

(22) Filed: Sep. 21, 2011

(65) Prior Publication Data

US 2013/0073911 A1 Mar. 21, 2013

(51) Int. Cl.
*G06F 11/00* (2006.01)

(52) U.S. Cl.
USPC .................................. 714/47.1; 702/182

(58) Field of Classification Search
USPC ............... 714/25, 33, 37, 47.1, 47.2, 47.3; 702/118, 179, 182, 183, 185
See application file for complete search history.

(56) References Cited

U.S. PATENT DOCUMENTS

| | | | |
|---|---|---|---|
| 6,073,089 A | 6/2000 | Baker et al. | |
| 6,453,268 B1 | 9/2002 | Carney et al. | |
| 6,684,349 B2 * | 1/2004 | Gullo et al. | 714/47.2 |
| 6,895,534 B2 | 5/2005 | Wong et al. | |
| 7,197,660 B1 | 3/2007 | Liu et al. | |
| 7,363,543 B2 | 4/2008 | Peebles et al. | |
| 7,457,725 B1 * | 11/2008 | Civilini | 702/183 |
| 7,631,076 B2 * | 12/2009 | Cannon et al. | 709/225 |
| 7,676,445 B2 | 3/2010 | Fry et al. | |
| 7,689,676 B2 | 3/2010 | Vinberg et al. | |
| 7,962,791 B2 | 6/2011 | Compton et al. | |
| 2004/0230873 A1 | 11/2004 | Ward | |
| 2005/0027727 A1 | 2/2005 | Garcea et al. | |
| 2007/0124130 A1 | 5/2007 | Brunet et al. | |
| 2008/0065577 A1 | 3/2008 | Chefalas et al. | |
| 2008/0271006 A1 * | 10/2008 | Nagappan et al. | 717/162 |
| 2009/0204232 A1 * | 8/2009 | Guru et al. | 700/9 |

* cited by examiner

*Primary Examiner* — Scott Baderman
*Assistant Examiner* — Joseph Kudirka
(74) *Attorney, Agent, or Firm* — Kunzler Law Group

(57) ABSTRACT

An apparatus for health monitoring includes a settings module, a field data module, a settings update module, and a monitoring module. The settings module is configured to store health monitoring settings for a plurality of monitored subsystems. The field data module is configured to receive field data, the field data comprising failure data of one or more systems of the same type as at least one of the monitored subsystems. The settings update module is configured to update the health monitoring settings stored by the settings module, wherein the health monitoring settings are updated based at least in part on the field data. The monitoring module is configured to perform one or more health monitoring tasks according to the health monitoring settings.

18 Claims, 5 Drawing Sheets

300

| | 302 | | | | | 304 | | | 306 | | |
|---|---|---|---|---|---|---|---|---|---|---|---|
| ID | System Type | Code Level | Current Up-Time | MTBF | # of Failures | Stability | Polling Interval | Consec. Failures | Blackout Period | System Priority |
| 1 | Tape | 1.2.2 | 15 | 2400 | 542 | Very Low | 10 min | 2 | 4 hrs | High |
| 2 | TSSC | 4.2.1 | 4562 | 9000 | 144 | High | 1.5 hrs | 3 | 15 hrs | Low |
| 3 | File | 7.66 | 1144 | 5500 | 25 | Medium | 30 min | 2 | 15 hrs | Medium |
| 4 | Tape | 1.2.2 | 2200 | 2400 | 542 | Very Low | 10 min | 2 | 4 hrs | High |
| 5 | File | 4.01 | 2954 | 3500 | 167 | Low | 15 min | 2 | 15 hrs | High |
| 6 | TSSC | 5.0 | 8853 | 12000 | 12 | Very High | 2 hrs | 3 | 15 hrs | Low |

300

| ID | System Type | Code Level | Current Up-Time | MTBF | # of Failures | Stability | Polling Interval | Consec. Failures | Blackout Period | System Priority |
|---|---|---|---|---|---|---|---|---|---|---|
| 1 | Tape | 1.2.2 | 15 | 2400 | 542 | Very Low | 10 min | 2 | 4 hrs | High |
| 2 | TSSC | 4.2.1 | 4562 | 9000 | 144 | High | 1.5 hrs | 3 | 15 hrs | Low |
| 3 | File | 7.66 | 1144 | 5500 | 25 | Medium | 30 min | 2 | 15 hrs | Medium |
| 4 | Tape | 1.2.2 | 2200 | 2400 | 542 | Very Low | 10 min | 2 | 4 hrs | High |
| 5 | File | 4.01 | 2954 | 3500 | 167 | Low | 15 min | 2 | 15 hrs | High |
| 6 | TSSC | 5.0 | 8853 | 12000 | 12 | Very High | 2 hrs | 3 | 15 hrs | Low |

| System Type | Code Level | Time to Failure | Error Code | Repair Time |
|---|---|---|---|---|
| TSSC | 4.2.0 | 1355 | Error 1 | 7 hrs |
| Tape | 1.2.2 | 2256 | Error 7 | 2 hrs |
| Tape | 1.2.2 | 2012 | Error 6 | 1 hr |
| File | 7.6.6 | 4279 | Error 3 | 5 hrs |
| Tape | 1.2.2 | 2667 | Error 3 | 2 hrs |
| Tape | 1.2.2 | 1508 | Error 3 | 2 hrs |
| File | 4.01 | 3009 | Error 6 | 4 hrs |
| Tape | 1.2.2 | 2553 | Error 3 | 2 hrs |

FIG. 4

SYSTEM HEALTH MONITORING

BACKGROUND

1. Field

The subject matter disclosed herein relates to system health monitoring and more particularly relates to autonomously updating monitoring settings based on actual system performance.

2. Description of the Related Art

Computing systems and networks are often used for providing a variety of services. Many of these services are extremely important to the proper functioning of a business. For example, computing systems may provide support services, such as email services, electronic data storage and backup services, or other services that enable a business to operate more effectively and efficiently. Computing services may also provide services that are the very nature or purpose of the business. For example, a main money making purpose of a business may be to provide online backup services, voice communication services, data communication services, web site hosting services and/or a variety of other customer-centric services. Often, fees are paid to the business in exchange for providing such services to a customer.

Due to the large extent to which businesses, individuals, and/or customers depend on the services provided by computing systems it is of great importance that problems, errors, or failures of a computing system or portion of a computing system are noticed, diagnosed, and/or remedied as quickly as possible. Quick recognition of problems may allow a company to begin diagnosing and correcting problems before significant consequences are felt by a business, individual, and/or customers.

BRIEF SUMMARY

An apparatus for system health monitoring is disclosed. In one embodiment, the apparatus includes a settings module, a field data module, a settings update module, and a monitoring module. In one embodiment, a settings module is configured to store health monitoring settings for a plurality of monitored subsystems. In one embodiment, a field data module is configured to receive field data. The field data may include failure data from one or more systems having the same type as at least one of the monitored subsystems. In one embodiment, a settings update module is configured to update the health monitoring settings stored by the settings module. The health monitoring settings may be updated based at least in part on the field data. In one embodiment, the monitoring module is configured to perform one or more health monitoring tasks according to the health monitoring settings.

A method for system health monitoring is also disclosed. In one embodiment, the method includes storing health monitoring settings for a plurality of monitored subsystems. In one embodiment, the method includes receiving field data that includes failure data from one or more systems having the same type as at least one of the monitored subsystems. In one embodiment the method includes updating the health monitoring settings stored by the settings module. In one embodiment, the health monitoring settings are updated based at least in part on the field data. In one embodiment, the method includes performing one or more health monitoring tasks according to the health monitoring settings.

A system for health monitoring is also disclosed. In one embodiment, the system includes a plurality of subsystems, a communication link between a monitoring apparatus and the plurality of subsystems, and the monitoring apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is an illustration of a matrix depicting exemplary data stored by a settings module;

FIG. 4 is an illustration of exemplary field data;

DETAILED DESCRIPTION

Figure 1:
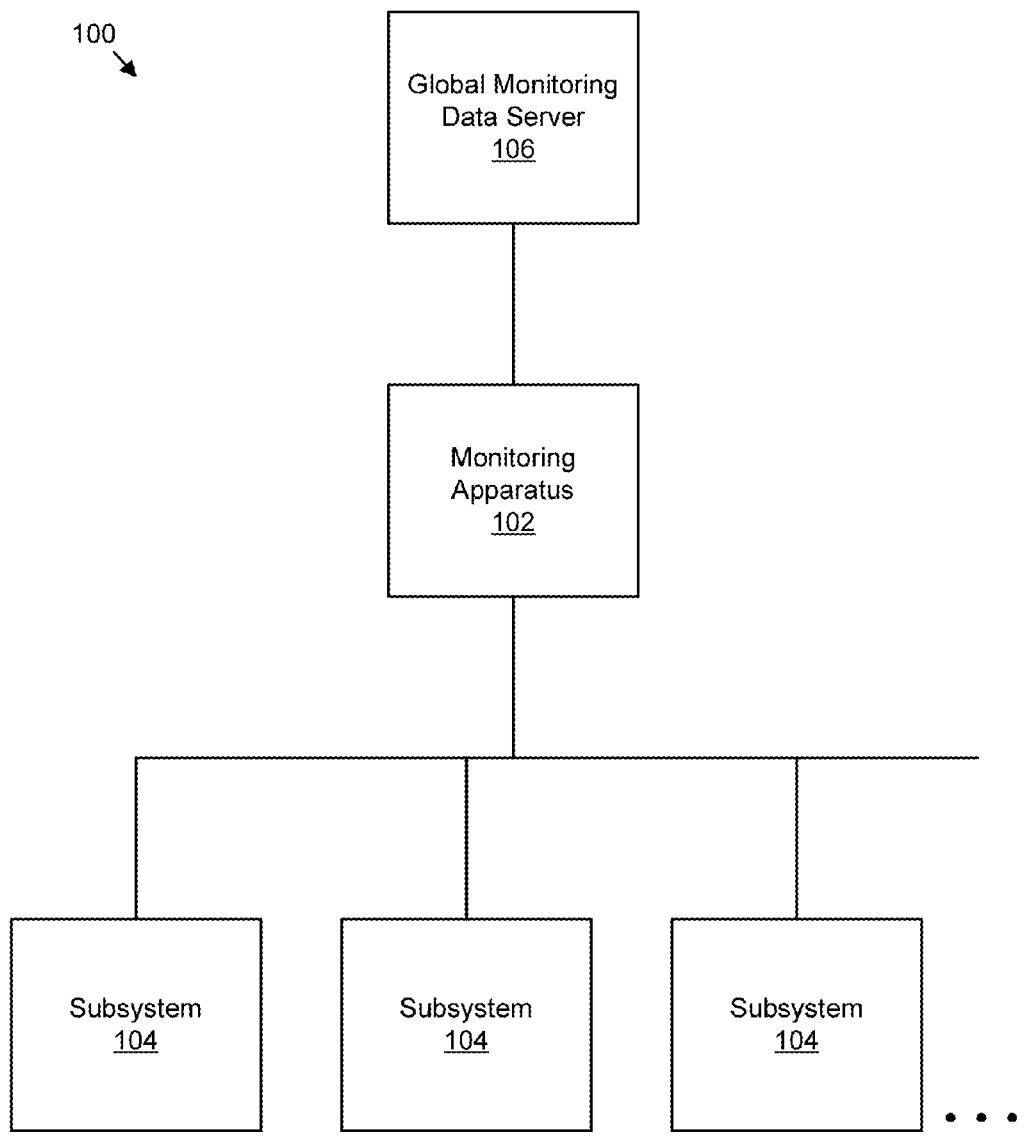
FIG. 1 is a schematic block diagram illustrating one embodiment of a computing system in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic drawing illustrating one embodiment of a computing system 100 for monitoring health of subsystems. The depicted computing system 100 includes a monitoring apparatus 102, a plurality of subsystems 104, and a global monitoring data server 106. As will be understood by one skilled in the art, the depicted computing system 100 of FIG. 1 is exemplary only. One or more embodiments may include one or more of the components depicted in FIG. 1. For example, in one embodiment the computing system 100 may not include the global monitoring data server 106.

In one embodiment, the computing system 100 provides one or more computing services. The computing services may include any computing services known in the art. Exemplary computing services may include telecommunications services, data storage services, file serving, web hosting services, application hosting services, web hosting services, or any other electronic services known in the art or services that may become available in the art. Additional exemplary computing services that may be provided include computing services for the management of physical assets such as power plants, transportation systems, piping systems, building control systems, and the like. According to one embodiment, the computing system 100 includes components of a data center, local area network (LAN), wide area network (WAN), or any other computing system known in the art.

In one embodiment, the computing system 100 includes a monitoring apparatus 102. In one embodiment, the monitoring apparatus 102 provides monitoring services to monitor the system health of one or more subsystems of the computing system 100. According to one embodiment, the monitoring apparatus 102 monitors one or more subsystems 104. As used herein the term "subsystem" is given to mean any physical or software portion of a computing system. In one embodiment, the computing system 100 includes a plurality of subsystems 104. In one embodiment, each subsystem 104 may include hardware and/or software for performing functions or executing code for supporting or providing one or more of the services of the computing system 100.

For example, the computing system 100 may provide web hosting and data storage services. According to one embodiment, one of the subsystems 104 may be responsible for one or more aspects of the web hosting services while another subsystem 104 may be responsible for one or more aspects of the data storage services. For example, one of the subsystems 104 may include software running on one or more blade servers for hosting one or more websites while another of the subsystems 104 may include a storage device for storing and retrieving data corresponding to the website. An additional subsystem 104 may include backup storage devices and/or software for managing the backup storage devices.

In one embodiment, the monitoring apparatus 102 may store health monitoring settings that control how the subsystems 104 are monitored. According to one embodiment, a different set of health monitoring settings are stored for each subsystem 104. According to one embodiment, having a different set of health monitoring settings may allow for more efficient monitoring of the subsystems 104. For example, a certain subsystem 104 may not require certain monitoring tasks to be performed as frequently while another subsystem 104 may require the same tasks to be performed quite frequently. Thus, by treating the subsystems 104 differently computing system 100 resources may be conserved which may reduce operating costs and/or allow the computing system 100 to better provide services.

According to one embodiment, the monitoring apparatus 102 may generate and/or receive field data regarding the operation of one or more of the subsystems 104. According to one embodiment, the field data may include data received from the subsystems 104. For example, the subsystems 104 may report errors, current states, or other information to the monitoring apparatus 102. In one embodiment, the field data may include information logged by the monitoring apparatus 102 as the result of performed or attempted monitoring tasks.

In one embodiment, the monitoring apparatus 102 adjusts or refines stored health monitoring settings based on how the subsystems 104 actually perform during use. In one embodiment, the monitoring apparatus 102 may autonomously update the health monitoring settings based on the field data. For example, field data indicating that health monitoring settings for a subsystem 104 are incorrect may result in the monitoring apparatus updating the settings to properly reflect how the subsystem should be monitored. In one embodiment, field data may indicate that the settings are incorrect if the field data indicates that likelihood of failure or the instability of the subsystem 104 is higher than is reflected in the settings. According to one embodiment, the longer a monitoring apparatus 102 monitors a subsystem 104 or the longer a subsystem 104 is used in real world environments, the better the monitoring settings track a desired amount of monitoring. According to one embodiment, even if the monitoring settings are initially set in a random way the monitoring apparatus 102 may be able to adjust to the actual monitoring needs of a subsystem.

In one embodiment, the monitoring apparatus 102 performs one or more monitoring tasks according to the stored health monitoring settings. In one embodiment, the monitoring tasks may include initiating and/or performing a health check, initiating and/or reporting errors, failures, or other problems, scheduling any monitoring task, or any other possible monitoring task. According to one embodiment, the monitoring apparatus 102 acts as a scheduler for monitoring tasks. In one embodiment, as a scheduler, the monitor apparatus 102 may simply schedule when certain tasks are to occur while allowing or requesting another apparatus, device, or system to perform the actual monitoring. According to one embodiment, the monitoring apparatus 102 determines what monitoring tasks should be performed at what times and/or what tasks or processes are allowed at a given time.

In one embodiment, the monitoring apparatus 102 is in communication with the subsystems 104. In one embodiment, the monitoring apparatus 102 is in communication with a global monitoring data server 106. The monitoring apparatus 102 may be in communication with the subsystems 104, and/or global monitoring data server 106 via a wired network connection, a wireless network connection, via the internet, and/or over a local area connection. One of skill in the art will recognize that communication links between the monitoring apparatus 102 and the subsystems 104 and global monitoring data server need not be direct communication links. Many embodiments may include intermediary devices such as servers, routers, switches, or other communication devices in the communication links.

In one embodiment, the computing system 100 includes a global monitoring data server 106. In one embodiment, the global monitoring data server 106 provides field data to the monitoring apparatus 102. According to one embodiment, the global monitoring data server 106 may provide field data from subsystems not monitored by the monitoring apparatus 102. For example, the subsystems not monitored by the monitoring apparatus 102 may include subsystems running in other computing systems.

According to one embodiment, the global monitoring data server 106 may also receive field data or other data from the monitoring apparatus 102. According to one embodiment, the global monitoring data server 106 may receive field data from a plurality of monitoring apparatuses 102 in a plurality of computing systems 100. According to one embodiment, subsystems 104 of a specific type may be updated based on field data from subsystems 104 of the same type on the same or other computing systems 100.

According to one embodiment, the global monitoring data server 106 aggregates data from numerous computing systems 100 and subsystems 104 located at different locations around the world. According to one embodiment, the global monitoring data server 106 may analyze this data and provide updated monitoring settings, risk assessments or other information to the monitoring apparatus 102. The monitoring apparatus 102 may then use this updated information during its monitoring tasks and/or settings updates.

Figure 2:
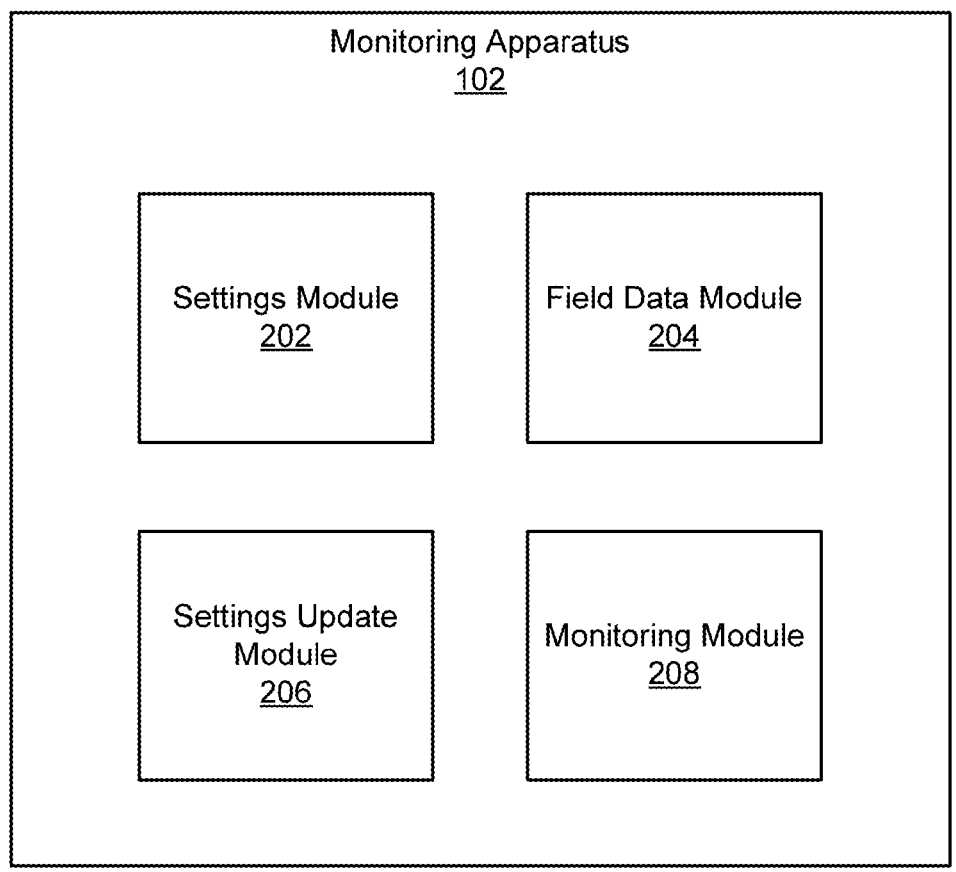
FIG. 2 is a schematic block diagram illustrating one embodiment of a monitoring apparatus in accordance with the present invention.

Turning now to FIG. 2, a schematic drawing illustrating one embodiment of a monitoring apparatus 102 is shown. The monitoring apparatus 102 is depicted as including a settings module 202, a field data module 204, a setting update module 206, and a monitoring module 208. It should be understood that the monitoring apparatus 102 need not be comprised of a single computer, server or other device. In fact, the monitoring apparatus 102 may include numerous hardware devices and/or software portions that function together to provide the functionality of the monitoring apparatus 102 and its modules 202-208. In at least one embodiment, one or more of the modules 202-208 may not be present in the monitoring apparatus 102.

In one embodiment, the monitoring apparatus 102 includes a settings module 202. In one embodiment, the settings module is configured to store health monitoring settings for a plurality of monitored subsystems. The health monitoring settings may be stored in a variety of formats as any type of computer readable data known in the art. In one embodiment, the health monitoring settings are stored as a matrix of settings. In one embodiment, the health monitoring settings are stored in one or more flat files, databases, tables, or any other data structure known in the art. In one embodiment, the health monitoring settings may be stored in dynamic or static memory for later reference or recall.

In one embodiment, the health monitoring settings stored by the health settings module are adjustable or updatable. According to one embodiment, the settings stored by the settings module may be updated by one or more of the other modules 204-208. Further discussion regarding updating the health monitoring settings stored by the settings module 202 will be discussed in relation to the respective modules.

According to one embodiment, the health monitoring settings include settings whose values affect the amount of load placed on the computing system 100 by health monitoring tasks. In one embodiment, the health monitoring settings stored by the settings module 202 include settings that control the frequency of and/or when monitoring tasks are to be performed. According to one embodiment, the health monitoring settings may include settings controlling how frequently the health of one or more of the subsystems 104 is checked and/or how responsive the monitoring apparatus 102 or other monitoring device or system should be in response to reported errors.

Exemplary health monitoring settings may include a polling interval setting, a number of consecutive failures before reporting setting, a blackout period for calls home setting, and/or system priority settings, as well as numerous other possible settings. Additional exemplary settings may include backup frequency, frequency for update checks, and frequency to pull subsystem logs. One of skill in the art will recognize numerous other health monitoring settings which may be used by the monitoring apparatus and which may be desirable to store. Some exemplary settings and their exemplary uses will be discussed further below.

The monitoring apparatus 102 may include a field data module 204. In one embodiment, the field data module 204 is configured to receive field data. As used herein the term "field data" is given to mean data derived or generated based on operation of a subsystem. For example, field data may include data logged by a subsystem and/or data logged or generated by monitoring software or a monitoring device, including the monitoring apparatus 102 or modules 202-208 of the monitoring apparatus 102. In one embodiment, the field data includes failure data of one or more subsystems 104.

In one embodiment, the field data received by the field data module 204 includes field data corresponding to one or more subsystems of the same type as the subsystems 104 monitored by the monitoring apparatus. The field data may include local field data. That is, field data may be from monitored subsystems 104 which are monitored by the monitoring apparatus 102. For example, the field data may have been derived or generated based on the operation of one of the subsystems 104 of the computing system 100 of FIG. 1. In one embodiment, the field data may be global field data from failure data from subsystems 104 which are not monitored by the monitoring apparatus 102. For example, the field data may have been derived or generated based on the operation of a subsystem that is not part of the computing system 100 of FIG. 1.

The field data received by the field data module 204 may be generated by a variety of different modules or devices, according to a number of different embodiments. In one embodiment, at least some field data is generated by a subsystem 104. In one embodiment, at least some field data is generated by the monitoring apparatus 102, such as by the monitoring module 208 or any of the other modules 202-206 of the monitoring apparatus. In other embodiments, the field data may be generated by any other device or system.

According to one embodiment, the monitoring apparatus 102 includes a settings update module 206. In one embodiment, the settings update module 206 is configured to update the health monitoring settings stored by the settings module. In one embodiment, the health monitoring settings are updated based at least in part on the field data received by the field data module 204. According to one embodiment, the field data may be used to calculate useful values such as risk assessment values or other values that may be useful in determining what a value for a health monitoring setting should be. For example, failure data may be used to calculate a mean-time between failure (MTBF) which may in turn be useful in determining how frequently a subsystem 104 should be polled. In one embodiment, certain field data values may simply be copied for storage. For example, a system type, a system code level, or an up-time of a subsystem 104 may simply be copied and stored with little or no analysis or calculation.

In one embodiment, the health monitoring settings may be updated on a periodic basis. For example, the settings update module 206 may update the health monitoring settings every week, every month, or some other time period. In another embodiment, the updates to one or more of the health monitoring settings may be triggered by some occurrence. For example, the receipt of a sufficient amount of field data may trigger an update. Additionally or alternatively, an error message or failure of a subsystem 104 may trigger an update. Other exemplary occurrences that may trigger an update in various embodiments include messages or requests to update from a global monitoring data server, error messages from subsystems, failures of subsystems, or any other occurrence.

In one embodiment, one or more rules for determining how field data affects health monitoring settings may be used by the settings update module 206. In one embodiment, rules may indicate that if a certain property of a subsystem 104 is indicated by the field data, one or more of the health monitoring settings should be affected in a certain way. For example, if field data indicates that a subsystem has a certain mean-time between failure (MTBF) and has been running for a certain amount of time without failure, the rules may indicate that a certain polling interval should be used.

Rules used to determine how field data is used to update the health monitoring settings may vary significantly. According to one embodiment, one rule for each health monitoring setting may take into account one or more types of field data to determine a value for each respective health monitoring setting. In one embodiment, each subsystem may have a default value and the field data and one or more rules may be updated to calculate a variation from the default value.

According to one embodiment, the settings update module 206 updates the health monitoring settings based on one or more properties or values derived from the field data. In one embodiment, the settings update module 206 determines a risk assessment for each of the monitored subsystems. According to one embodiment, the risk assessment includes one or more values or properties indicating the risk of failure for a subsystem. Exemplary values or properties may include the meant-time between failure, stability, code level, system type, or other values or properties.

In one embodiment, the monitoring apparatus may include a monitoring module 208. In one embodiment, the monitoring module 208 performs one or more health monitoring tasks according to the health monitoring settings stored by the settings module 202. For example, the monitoring module 208 may initiate a polling task at intervals defined in a polling interval setting. The monitoring module 208 may perform health monitoring tasks by initiating an action, performing an action itself, or denying request based on health monitoring settings. In one embodiment, the monitoring module 208 may act solely or primarily as a scheduler while allowing other modules, devices, or systems to perform actual health tests, or other actions.

In one embodiment, the monitoring module 208 may log or generate data regarding the monitoring of the subsystems 104. In one embodiment, the monitoring module 208 may log the occurrence of monitoring events, errors with subsystems, or any other information relating to the monitoring of subsystems. According to one embodiment, the monitoring module 208 may log or generate field data which may then be provided to the field data module 204.

FIG. 3 illustrates a matrix 300 of exemplary information corresponding to monitored sub systems. According to one embodiment, the matrix 300 or similar data is stored by the settings module 202. According to one embodiment, the matrix 300 represents a matrix storage structure in which the data may be stored. As discussed above, the same or similar data may be stored in a variety of other data formats include flat files, databases, tables, spreadsheets, or any other type of data storage format. In one embodiment, portions of the data displayed in the matrix 300 may be incorporated in multiple different files or data structures.

In the depicted embodiment the matrix includes a plurality of rows and columns. According to one embodiment, each column contains values corresponding to a certain property, value or setting. In one embodiment, each of the rows corresponds to a monitored subsystem, such as the subsystems 104 of FIG. 1. According to one embodiment, each of the values in the matrix 300 may be updated, deleted, or otherwise changed.

In the depicted embodiment, the matrix 300 includes exemplary subsystem information 302, risk assessment information 304, and health monitoring settings 306. According to one embodiment, the subsystem information 302 includes information identifying one or more subsystems 104 of a computing system.

In one embodiment, the subsystem information 302 includes information corresponding to a specific subsystem 104 of a computing system 100. In the depicted embodiment, the subsystem information 302 includes an ID column, a system type column, a code level column, and a current up-time column. According to one embodiment, the ID column includes a value for identification of a subsystem. In one embodiment, the ID may include a sequential value reflecting an order of registration of subsystems for monitoring. In one embodiment, the ID may include some other value corresponding to a subsystem such as a media access control (MAC) address, a serial number, or any other value. In one embodiment, the ID may be used as a reference value by the monitoring apparatus 102 and/or modules 202-208.

According to one embodiment, the system type column includes information that indicates the type of a subsystem. For example, a certain subsystem may have a certain name or other identifier that indicates the type of subsystem. The names may include names given by a manufacturer or designer or may include a name that describes the overall purpose of the system. For example, tape drives made by different manufactures may include the same or different system types depending on the embodiment.

In the depicted embodiment, each row includes a name identifying the system type including names such as "tape" which may correspond to a tape storage system, "file" which may correspond to a file server or file server software, and "TSSC" for total system storage consul which may correspond to a remote access system for one or more tape or disk drive storage systems. The names and system types are exemplary only as other names corresponding to other types of systems may also be included in some embodiments.

According to one embodiment, the code level column includes information that indicates the code level or code version for a certain system. For example, the code level may include the code version of software that is used to operate a subsystem. In one embodiment code may be developed and released in a series of steps. According to one embodiment each release receives a new number to indicate the code version or code level of the released software. In one embodiment, the monitoring apparatus 102 may differentiate between different code levels of the same type of system to more particularly customize settings updates.

According to one embodiment, the current up-time column includes information that indicates the amount of time that the system has been running without an error or failure. According to one embodiment, the up-time may include the amount of time the system has been running since the last initiation of the boot, such as a system restart or boot.

According to one embodiment, the up-time of a system may be used to determine a risk assessment and/or one or more health monitoring settings. For example, the system up-time may be compared to the mean-time between failure of the system to determine how long a polling interval setting should be. In one embodiment, as the system up-time gets closer to the mean-time between failure the polling interval may decrease. Similarly, a risk assessment value, such as stability may be adjusted as the mean-time between failure is approached.

In the depicted embodiment the risk assessment information 304 includes a MTBF (meant time between failure) column, a number of failures column and a stability column. According to one embodiment, the mean-time between failure column includes the mean-time between failure for a specific system. In one embodiment, the mean-time between failure may be calculated based on collected field data, such as the field data of FIG. 4 which will be discussed later. In one embodiment, the mean-time between failure may be used to calculate one or more of the health monitoring settings. For example, the polling interval or system priority settings may be adjusted based on how close a current up-time of a subsystem is to the mean-time to failure.

In the depicted embodiment, the risk assessment information 304 also includes a number of failures (# of failures) column. This may include the number of failures from which the mean-time between failure (MTBF) values have been calculated. This may be useful for example, when updating the mean-time between failures column based on new field data. For example, it may be necessary to know the overall number of failures when calculating the mean-time between failure. By storing the number of failures in the risk assessment information 304 a mean-time between failure that accounts for new and old failures can be easily done.

The number of failures may also provide information regarding how accurate the risk assessment and health monitoring settings are for a given system. For example, a larger number may indicate more experience with a particular system and may allow a system to more particularly determine settings that more closely reflect risks of subsystem failures or problems.

In the depicted embodiment, the risk assessment information 304 includes a stability column. In one embodiment, the stability column may include information about the stability of a corresponding subsystem. In the depicted embodiment, the stability column includes values ranging from "very low" to "very high" indicating how stable the subsystem is. In one embodiment, the stability may indicate a likelihood of failure of a subsystem at a certain point of time or during a certain time period. For example, the stability may indicate a likelihood between 0 and 1 for a time period before the risk assessment and/or health monitoring settings are updated. In one embodiment, the stability may include a standard deviation value indicating the likelihood of failure for the time surrounding a meant-time between failure.

In one embodiment, the stability may be calculated from field data. For example, the distribution of failures in relation to the mean-time between failure may be analyzed to create a probably curve for the likelihood of failure at a given up-time. Similar to the other risk assessment values, the values in the stability column may be used to determine or adjust values of one or more of the health monitoring settings.

In the depicted embodiment, the health monitoring settings 306 include a polling interval column, a consecutive failures column, a blackout period column, and a system priority column. According to one embodiment, the values in the polling interval column control how often the health of a subsystem 104 is checked or "polled". In one embodiment, for example, subsystems are periodically communicated with to see if they respond and/or how well they are functioning. In one embodiment, a subsystem 104 is requested to perform a diagnostic test and return the results of the values. The polling interval setting may be used to control how often such tasks are performed.

In one embodiment, the polling interval may vary according to one or more values in a risk assessment (such as values in the values in the MTBF, # of Failures, or Stability columns) and/or field data. According to one embodiment, the values or information created, gathered, or received during a task initiated at intervals defined by the polling interval may be used to update the polling interval values.

In one embodiment, the polling interval values may vary as a current up-time of a system approaches the meant-time between failure time. In one embodiment, the polling interval may be based on the stability of a subsystem. For example, a subsystem with very high stability may have a much longer polling interval than a subsystem with a very low stability. In one embodiment, the polling interval may be determined by referencing a table or rule that defines the polling interval based on the stability.

According to one embodiment, the consecutive failures column includes a threshold value of how many consecutive failures must result from a monitoring task before the failure is reported. In one embodiment, each time a subsystem is polled the subsystem, the monitoring apparatus 102, or another device may return a value indicating a success or failure of the task. In some cases, such report of failure or success may be false positives or false negatives. Thus, the consecutive failures column may control how sensitive to a reported failure the monitoring apparatus 102 should be.

In one embodiment, values in the consecutive failures column may be adjusted based on field data and/or one or more other values in the matrix 300, similar to the polling interval setting. In one embodiment, for example, a consecutive failures threshold may have a larger value for a highly stable subsystem than for a subsystem with low or very low stability. This may reduce the number of "false positives" or incorrect reporting of errors that are reported.

According to one embodiment, the blackout period column includes values that restrict how frequently calls home can be made by or on behalf of a subsystem. In one embodiment, for example, the blackout period defines a period of time after a first call home during which an additional calls home may not be initiated or made. In one embodiment, this may give a diagnostic system or team enough time to resolve the error without unnecessarily repeating diagnostic procedures or monitoring tasks.

In one embodiment, the blackout period may be an estimate of the amount of time required to diagnose and remedy a failure. This may increase the likelihood that no calls home are allowed until an error or failure has been remedied or is believed to have been remedied. Once the blackout period has expired calls home may once again be allowed by or on behalf of the subsystem. This may allow additional information to be gathered if an error or failure has not yet been remedied, even if it was believed to have been remedied.

Once again, the blackout period may be updated based on field data and/or other values in the matrix 300.

According to one embodiment, the system priority column includes a priority ranking of the plurality of subsystems 104 monitored by a monitoring apparatus 102. In one embodiment, a system priority setting defines which subsystems 104 get priority when performing monitoring tasks. For example, if two subsystems 104 are schedules to be polled, the subsystem 104 with the higher priority may be polled first.

In one embodiment, the system priority may be updated based on field data and/or other values in the matrix 300. In one embodiment, the system priority may be updated periodically, such on a set time period of a week, a month, or other time period. In one embodiment, the system priority may be updated in response to an occurrence or event such as a report of an error, or a failure to perform a monitoring task. For example, if a monitoring task is skipped due to a task needed for a higher priority subsystem, the priority of the skipped subsystem may be increased. In one embodiment, the system priority may be set by an administrator or automatically by rule. For example, it may be desirable for a owner to prioritize certain services if they are vital to proper business operation or to providing good services to customers.

Additional or alternate settings may be used in some embodiments. For example, in one embodiment, the settings may include a backup interval setting, an update check setting, and a log download setting. In one embodiment, the backup interval setting may control how often data on a subsystem is backed up. In one embodiment, the update check setting may control how often updates for a subsystem are checked for. In one embodiment, the log download setting may control how often logs kept by a subsystem are downloaded or pulled to a different device or system. In one embodiment, any of these settings may be adjusted in manners similar to those previously discussed. For example, a subsystem that stores data may be in danger of losing the data if the subsystem fails. In one embodiment, a backup interval setting may be shortened as the current up-time approaches the meant-time between failure.

Turning now to FIG. 4 a matrix 400 illustrating exemplary field data is shown. According to one embodiment, the field data may have been received from another device and/or gathered or generated by a monitoring apparatus 102. Once again, the data is depicted in matrix form for illustrative purposes only; some embodiments may receive or gather field data in any storage format known in the art.

In the depicted embodiment, the matrix 400 includes a number of columns and rows. In one embodiment, each column corresponds to a different type of field data while each row corresponds to a specific occurrence, such as a failure or error of a subsystem. In the depicted embodiment, the matrix 400 includes a system type column, a code level column, a time to failure column, an error code column, and a repair time column.

According to one embodiment, the system type column and code level column include data that is the same or similar to the data of the system type column and the code level column, respectively, of matrix 300. In one embodiment, the system type column functions to identify field data with a corresponding subsystem. In one embodiment, only data that corresponds to the same type of subsystem and/or code level is used to update risk assessments and/or health monitoring settings. In one embodiment, subsystems having the same system type of different code levels may use the same field data for health monitoring setting updates.

According to one embodiment, the time to failure column includes data indicating the up-time of a subsystem prior to the occurrence of a recorded event or failure. In one embodiment, a subsystem or a monitoring device or system, such as the monitoring apparatus 102, may track the amount of time the subsystem has been running without failure or error. In one embodiment, the amount of time between boot and restart to a failure is recorded in the time to failure column.

According to one embodiment, the time to failure values may be used to update a mean-time between failure value stored by the monitoring apparatus 102. In one embodiment, for example, the MTBF column of matrix 300 would be updated to reflect any field data that relates to a specific monitored subsystem. In one embodiment, the time to failure values may be used to update the risk assessment information 304 and/or the health monitoring settings 306.

As an example, the time to failures for the "Tape" system types may be used to calculate a mean-time between failure for the "tape" subsystems listed in matrix 300. In one embodiment, the newly calculated mean-time between failure may be used to adjust the mean-time between failure stored in the MTBF column of matrix 300 but would not affect subsystems having a "TSSC" or "File" system type.

According to one embodiment, the error code column includes data that identifies an error code encountered during a logged occurrence. In one embodiment, an error code may be useful to identify the type of occurrence or a severity of an encountered problem or error. In one embodiment, error code information may influence how other data related to the occurrence is used. In one embodiment, for example, an occurrence that includes an error code indicating a minor error may not be significant enough to be counted as a "failure" and values in the time to failure column or repair time columns may not be used to update risk assessment or health monitoring settings values.

According to one embodiment, the repair time column indicates an amount of time between when an error is reported and a time when it is remedied. In one embodiment, for example, upon report of a failure or a call home to diagnose a problem, a time may be logged. Upon a successful restart or reboot of a subsystem, the time of restart or reboot may be logged as well. The repair time may then be calculated by determining the number of hours between the failure or call home time from and the successful restart or reboot.

In one embodiment, the repair time may be used to update one or more of the exemplary values of the matrix 300. In one embodiment, for example, the repair time may be used to update the blackout period between calls home. In one embodiment, the blackout period may be set to a value that gives a repair team or individual the time needed to diagnose and resolve a majority of the encountered errors. This may reduce the number of redundant reported errors or reported failures. This may allow for a reduced amount of load on a computing system 100, subsystem 104, monitoring apparatus 102, or other device or system that may be used to assist in diagnosing or repairing errors.

Although the matrix 400 depicts field data related to failures of one or more subsystems, other types of field data may also be gathered. In one embodiment, data relating to the current state of a subsystem may be gathered or received. For example, a current up-time, subsystem load, temperature, amount of free memory, or any other information regarding the operation or state of a subsystem may be gathered. One of skill in the art will recognize numerous other types of data that may be gathered and that may be desirable in one or more embodiments.

Figure 5A:
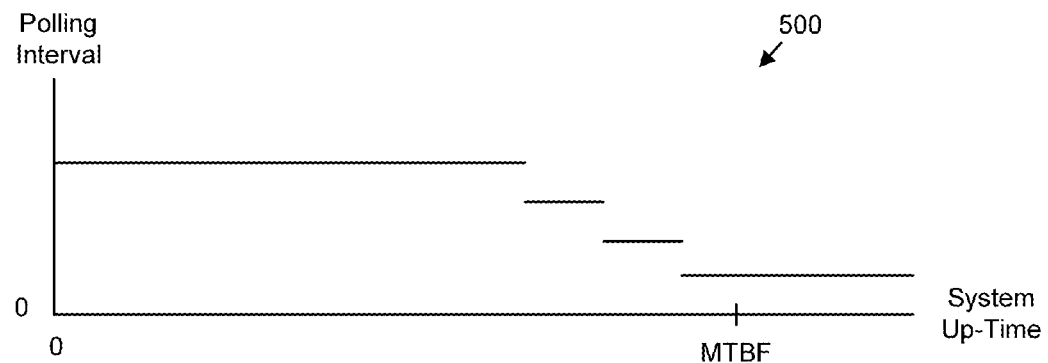
FIGS. 5A and 5B are exemplary graphs illustrating the varying of a subsystem polling interval with respect to subsystem up-time.
Figure 5B:
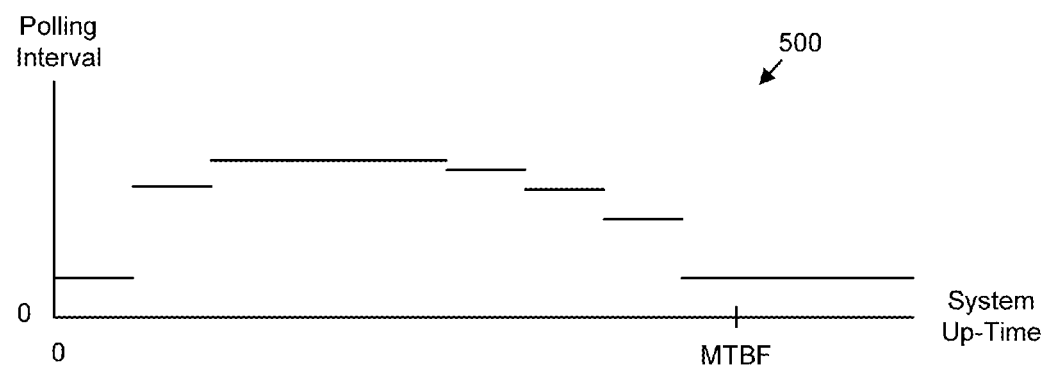

FIGS. 5A and 5B show graphs 500 illustrating exemplary adjustment of a polling interval setting based on a system up-time of a subsystem, according to varying embodiments. FIG. 5A depicts a polling interval that begins at a maximum value and decreases as the system up-time approaches the mean-time between failure time for the subsystem. In the depicted embodiment, when the system up-time is near zero the poling interval time is at a maximum. In the depicted embodiment, the system up-time remains at a maximum time and then begins to decrease as the mean-time between failure is approached.

In the depicted embodiment, the polling interval is adjusted on a periodic basis and results in a step-wise graph 500 showing the decrease in the polling interval. Some embodiments may include real time adjustments of polling interval and thus may result in smaller steps and/or a smoother graph.

In the depicted embodiment, the decrease in the polling interval begins about three periods (or three steps) before the mean-time between failure. In one embodiment, the decrease may further away from or closer to the mean-time between failure value. In one embodiment, the begin in the decrease may be based upon statistical data showing the likelihood of failure at a certain point in time. For example, a stability value, such as that depicted in matrix 300, or some other value or calculation may affect the steepness and or shape of the decline from the maximum polling interval value to a value near the mean-time between failure.

FIG. 5B depicts a polling interval that begins at a low value, increase to a high value and then decreases to a low value as the mean-time between failure approaches. In one embodiment, it may be desirable to begin at a low value when setting up a subsystem. In one embodiment, for example, a subsystem may be more susceptible to failures or errors shortly after installation or reboot than after a time of running properly. For example, some subsystems, such as hardware portions of subsystems, may have a greater likelihood of failure during the first month of use than the second, third or subsequent months. In one embodiment, the low polling interval at the beginning may help recognize errors or problems very quickly when the likelihood of error or failure is high.

In the depicted embodiment, the increase from the beginning low to the high and the decrease from the high to the low near the mean-time between failure are not linear but are logarithmic step-wise increases and decreases. In one embodiment, a logarithmic type increase and/or decrease may better reflect actual probabilities of failure during certain time periods.

Figure 6:
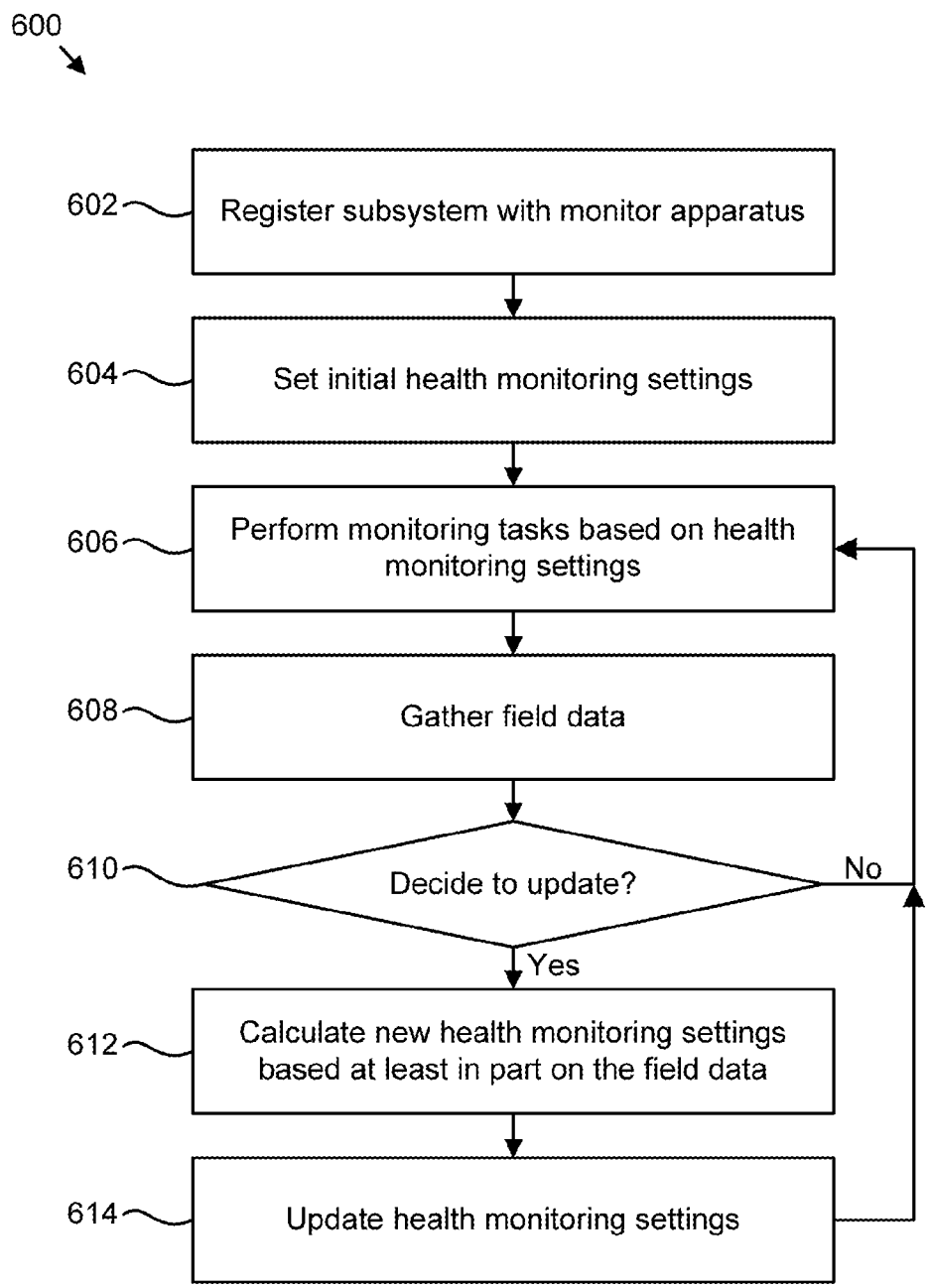
FIG. 6 is a schematic flow chart diagram illustrating one embodiment of a method for monitoring a subsystem in accordance with the present invention.

Turning now to FIG. 6 one method 600 for monitoring a subsystem wherein health monitoring settings are autonomously updated is shown. In one embodiment, the method 600 is performed by a monitoring apparatus 102. In one embodiment, the method 600 may be performed independently for each subsystem monitored by the monitoring apparatus 102.

A subsystem may be registered 602 with a monitoring apparatus 102. The subsystem may be registered in response to a variety of occurrences. In one embodiment, the subsystem may be registered 602 upon installation or setup within a computing system 100. In one embodiment, the subsystem may be registered 602 upon installation of monitoring software or upon being in communication with the monitoring apparatus 102.

In one embodiment, registering 602 a subsystem with a monitoring apparatus 102 includes creating a new entry in a data store for the subsystem. In one embodiment, the settings module 202 creates a new row in a matrix 300 for information corresponding to the subsystem. In one embodiment, one or more details may be filled in for the subsystem. For example, a subsystem ID, a subsystem type, and/or a subsystem code level may be stored by the settings module 202.

In one embodiment, initial health monitoring settings may be set 604 for the subsystem. In one embodiment, the health monitoring settings may be set 604 to default values. For example, the monitoring apparatus 102 may have a stored default health monitoring configuration for new systems. In one embodiment, the default health monitoring settings may be the same for all subsystem types. In one embodiment, the default health monitoring settings may be specific to each subsystem type and/or code level.

According to one embodiment, initial health monitoring settings may be retrieved from a remote device or system, such as a global monitoring data server 106. In one embodiment, the settings provided by the global monitoring data server 106 are set 604 by storing the health monitoring settings in a data store.

In one embodiment, monitoring tasks may be performed 606 based on the health monitoring settings. For example, the health monitoring settings may control how frequently certain tasks are performed 606. As discussed above, numerous different health monitoring settings may be used to affect how monitoring tasks are performed 606. Any of the exemplary monitoring tasks or settings may be used in the manner discussed in this disclosure. Additional settings and uses within the scope of the present disclosure will be recognized by one of skill in the art. In one embodiment, the monitoring tasks may be wholly or partly performed by the monitoring apparatus 102, and/or another device or system. In one embodiment, the performing 606 of monitoring tasks may be performed wholly by another device or system. For example, a monitoring apparatus 102 may only perform some subset of the steps 602-614 shown while leaving other steps to be performed by another device or system.

In one embodiment, the monitoring apparatus 102 gathers 608 field data. In one embodiment, the field data is gathered 608 by receiving field data from the monitored subsystem or from any other device. In one embodiment, the monitoring apparatus 102 gathers 608 field data by generating field data based on performed 606 monitoring tasks. For example, the monitoring module 208 may generate field data based on the results of initiated monitoring tasks. In one embodiment, the field data gathered 608 may include local field data, or data only from subsystems monitored by the monitoring apparatus 102. In one embodiment, the field data gathered 608 may include global field data, or data from subsystems not monitored by the monitoring apparatus 102. In one embodiment, global field data may be received from a remote server such as a global monitoring data server 106. According to one embodiment, global field data and local field data may be gathered 608. In one embodiment, gathered 608 field data, whether received or generated, is received and/or stored by the field data module 204.

In one embodiment, the monitoring apparatus 102 decides 610 whether to update the health monitoring settings. If the decision 610 to update is No, the monitoring apparatus 102 may continue to perform 606 monitoring tasks without updating. In one embodiment, the monitoring apparatus 102 decides 610 whether to update based on the amount of field data gathered 608, the time since the settings were last updated or initiated, and/or whether a specific event has occurred.

In one embodiment, the decision 610 may be based on a set period of time, such as every month, week, or any other time period. For example, when that period of time has elapsed, the decision 610 may be Yes. In one embodiment, the decision 610 may be based on receiving a certain amount of field data. For example, if a certain amount of failures or errors are logged or received, the decision 610 may be a yes. In one embodiment, the decision 610 may be based on an occurrence of an event. For example, the failure of a subsystem may initiate the decision 610 to update and result in a Yes decision.

If the decision 610 to update is Yes, the monitoring apparatus 102 may then calculate 612 new health monitoring settings based at least in part on the gathered field data. In one embodiment, one or more rules control the calculation 612 based on the field data. In one embodiment, the settings update module 206 calculates 612 new settings by performing a risk assessment and then determining updated health monitoring settings based on the risk assessment. In one embodiment, one or more rules for relating specific field data to a risk assessment and/or health monitoring settings may be used to calculate 612 new health monitoring settings.

In one embodiment, the health monitoring settings are updated 614 to reflect the calculated 612 new health monitoring settings. In one embodiment, the health monitoring settings stored by the settings module 202 may be updated 614 to reflect the new health monitoring settings.

Following the updating 614 of the settings, steps 606-614 may be repeated one or more times. In one embodiment, steps 606-614 may be repeated over time as the subsystem is monitored. According to one embodiment, the health monitoring settings are updated to reflect the actual performance of the subsystem and may allow for more efficient and accurate monitoring of the subsystem over time.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a non-transitory computer readable storage medium storing computer readable program code executable by a processor, the computer readable program code comprising:
   a settings module configured to store health monitoring settings for a plurality of monitored subsystems;
   a field data module configured to receive field data, the field data comprising failure data of one or more systems of a same type as at least one of the monitored subsystems, wherein subsystems of the same type have different health monitoring settings and the different health monitoring settings are based on different up-times since failure between the same types of subsystems;
   a settings update module configured to update the health monitoring settings stored by the settings module, wherein the health monitoring settings are updated based at least in part on the field data; and
   a monitoring module configured to perform one or more health monitoring tasks according to the health monitoring settings.

2. The apparatus of claim 1, wherein the field data comprises one or both of local field data and global field data, wherein local field data comprises field data from the plurality of monitored subsystems and global field data comprises field data from at least one subsystem not monitored by the apparatus.

3. The apparatus of claim 2, wherein the settings update module updates the health monitoring settings based at least in part on both the local field data and the global field data.

4. The apparatus of claim 1, wherein the health monitoring settings are initiated to default values, and wherein the health monitoring settings are updated based on the field data.

5. The apparatus of claim 1, wherein each monitored subsystem of the plurality of subsystems has a corresponding set of health monitoring settings.

6. The apparatus of claim 1, wherein the settings update module is further configured to analyze the field data and determine a risk assessment for the plurality of monitored subsystems, wherein the health monitoring settings are updated based at least in part on the risk assessment.

7. The apparatus of claim 6, wherein each subsystem of the plurality of subsystems has a corresponding risk assessment.

8. The apparatus of claim 6, wherein subsystems of the same type but different code levels have a different risk assessment.

9. The apparatus of claim 6, wherein the risk assessment comprises a mean-time between failure for at least one of the subsystems.

10. The apparatus of claim 6, wherein the risk assessment comprises a stability for at least one of the subsystems.

11. The apparatus of claim 6, wherein a risk assessment reflecting increased risk results in one or both of health monitoring settings for more frequent performance of monitoring tasks and health monitoring settings for more responsive reaction to reported errors.

12. The apparatus of claim 1, wherein the health monitoring settings comprise one or more of:
   a polling interval setting;

a system priority setting;
a number of consecutive failures before reporting setting; and
a call home blackout period setting.

13. The apparatus of claim 12, wherein the health monitoring settings comprise a system priority setting and wherein the system priority setting is increased if a corresponding subsystem of the monitored subsystems gets skipped during a monitoring task.

14. The apparatus of claim 12, wherein the health monitoring settings comprise a polling interval setting and wherein the polling interval setting is decreased for a corresponding subsystem of the monitored subsystems as a system up-time since failure for the corresponding subsystem approaches a mean-time between failure.

15. The apparatus of claim 1, wherein the field data comprises one or more of an up-time before failure, an error code, a repair time, a system type, and a system code level.

16. A computer program product for system health monitoring, the computer program product comprising:
   a non-transitory computer readable storage medium having computer readable program code embodied therein, the computer readable program code configured to:
   store health monitoring settings for a plurality of monitored subsystems;
   receive field data, the field data comprising failure data of one or more systems of a same type as at least one of the monitored subsystems, wherein subsystems of the same type have different health monitoring settings and the different health monitoring settings are based on different up-times since failure between the same types of subsystems;
   update the health monitoring settings stored by the settings module, wherein the health monitoring settings are updated based at least in part on the field data; and
   perform one or more health monitoring tasks according to the health monitoring settings.

17. A system comprising:
   a monitoring apparatus;
   a plurality of monitored subsystems;
   a communication link between the monitoring apparatus and the plurality of monitored subsystems, the monitoring apparatus comprising:
      a non-transitory computer readable storage medium storing computer readable program code executable by a processor, the computer readable program code comprising:
      a settings module configured to store health monitoring settings for the plurality of monitored subsystems, wherein the health monitoring settings comprise a polling interval setting and wherein the polling interval setting is decreased for a corresponding subsystem of the monitored subsystems as a system up-time since failure for the corresponding subsystem approaches a mean-time between failure;
      a field data module configured to receive field data, the field data comprising failure data of one or more systems of a same type as at least one of the monitored subsystems;
      a settings update module configured to update the health monitoring settings stored by the settings module, wherein the health monitoring settings are updated based at least in part on the field data; and
      a monitoring module configured to perform one or more health monitoring tasks according to the health monitoring settings.

18. The system of claim 17, further comprising a global monitoring data server in communication with the monitoring apparatus, the global monitoring data server configured to provide global field data to the monitoring apparatus.

\* \* \* \* \*